US008514158B2

(12) United States Patent
Kimura

(10) Patent No.: US 8,514,158 B2
(45) Date of Patent: Aug. 20, 2013

(54) LIQUID CRYSTAL DRIVING DEVICE

(75) Inventor: Hiroaki Kimura, Kanagawa (JP)

(73) Assignee: NLT Technologies, Ltd., Kanagawa (JP)

(*) Notice: Subject to any disclaimer, the term of this patent is extended or adjusted under 35 U.S.C. 154(b) by 1012 days.

(21) Appl. No.: 11/684,932

(22) Filed: Mar. 12, 2007

(65) Prior Publication Data

US 2007/0216623 A1 Sep. 20, 2007

(30) Foreign Application Priority Data

Mar. 14, 2006 (JP) ................................. 2006-069691

(51) Int. Cl.

| | |
|---|---|
| ***G09G 3/36*** | (2006.01) |
| ***G09G 5/00*** | (2006.01) |
| ***G09G 5/10*** | (2006.01) |
| ***G06F 3/038*** | (2006.01) |

(52) U.S. Cl.

USPC ................ 345/89; 345/87; 345/204; 345/690

(58) Field of Classification Search

USPC ................... 345/84-104, 204-215, 690-699; 348/790-794

See application file for complete search history.

(56) References Cited

U.S. PATENT DOCUMENTS

| | | | | |
|---|---|---|---|---|
| 6,072,451 | A * | 6/2000 | Mano et al. | 345/89 |
| 2003/0184569 | A1* | 10/2003 | Koga et al. | 345/690 |
| 2003/0210216 | A1* | 11/2003 | Kim et al. | 345/87 |
| 2004/0125064 | A1* | 7/2004 | Adachi et al. | 345/89 |
| 2004/0196274 | A1* | 10/2004 | Song et al. | 345/204 |
| 2004/0257325 | A1* | 12/2004 | Inoue | 345/89 |
| 2005/0001802 | A1* | 1/2005 | Lee | 345/89 |
| 2005/0083353 | A1* | 4/2005 | Maruyama et al. | 345/690 |
| 2005/0231492 | A1* | 10/2005 | Shen et al. | 345/204 |
| 2006/0022926 | A1* | 2/2006 | Mizumaki et al. | 345/89 |
| 2006/0066544 | A1* | 3/2006 | Sasaki et al. | 345/87 |

FOREIGN PATENT DOCUMENTS

| | | | |
|---|---|---|---|
| CN | 1512478 | A | 7/2004 |
| JP | 07-334131 | A | 12/1995 |
| JP | 2001343956 | A | 12/2001 |

(Continued)

OTHER PUBLICATIONS

Google Dictionary, Defintion of Conventional, Jun. 30, 2011, pp. 1-2.*

(Continued)

*Primary Examiner* — Alexander Eisen
*Assistant Examiner* — Patrick F Marinelli
(74) *Attorney, Agent, or Firm* — Sughrue Mion, PLLC

(57) ABSTRACT

A liquid crystal driving device is provided which enables an overshooting driving operation in transition among all gray levels. When a voltage for displaying is controlled so as to be a highest-level value out of the voltages for displaying corresponding to an input gray level range, an overshooting driving voltage for transition to a higher voltage which is added to a voltage side being higher than the highest-value value out of the voltages for displaying is applied to a liquid crystal panel and, when a voltage for displaying to be applied to the liquid crystal panel is controlled so as to be a lowest-level value out of the voltages for displaying corresponding to the input gray level range, an overshooting driving voltage for transition to a lower voltage which is added to a voltage side being lower than the lowest-level value of the voltages for displaying is applied to the liquid crystal panel.

6 Claims, 10 Drawing Sheets

(56) References Cited

FOREIGN PATENT DOCUMENTS

| | | | |
|---|---|---|---|
| JP | 2002351409 | A | 12/2002 |
| JP | 200336055 | A | 2/2003 |
| JP | 2003-172915 | A | 6/2003 |
| JP | 2003207762 | A | 7/2003 |
| JP | 2004-061692 | A | 2/2004 |
| JP | 2004199070 | A | 7/2004 |
| JP | 2004226952 | A | 8/2004 |
| JP | 2004246312 | A | 9/2004 |
| JP | 2004281380 | A | 10/2004 |
| JP | 2005301220 | A | 10/2005 |
| JP | 200698472 | A | 4/2006 |
| JP | 2007065670 | A | 3/2007 |
| JP | 200794407 | A | 4/2007 |
| WO | WO 2007074560 | A1 | 7/2007 |

OTHER PUBLICATIONS

Office Action dated Nov. 1, 2011 from the Japanese Patent Office in counterpart Japanese application No. 2006069691.

* cited by examiner

FIG.10 (RELATED ART)

Current Gray-level Value

One Past Gray-level Value

| | 0 | 64 | 128 | 192 | 255 |
|---|---|---|---|---|---|
| 0 | 0 | 70 | 150 | 220 | 255 |
| 64 | 0 | 64 | 140 | 210 | 255 |
| 128 | 0 | 50 | 128 | 200 | 255 |
| 192 | 0 | 30 | 110 | 192 | 255 |
| 255 | 0 | 10 | 90 | 160 | 255 |

Overshooting Gray-level Value

LIQUID CRYSTAL DRIVING DEVICE

BACKGROUND OF THE INVENTION

1. Field of the Invention

The present invention relates to a liquid crystal driving device to drive a liquid crystal panel of a liquid crystal display device.

The present application claims priority of Japanese Patent Application No. 2006-069691 filed on Mar. 14, 2006, which is hereby incorporated by reference.

2. Description of the Related Art

Conventionally, a liquid crystal display device has a problem of a phenomenon in which an image leaves a trail when moving images are displayed. This phenomenon is caused by a delay in response of a liquid crystal element. To prevent this phenomenon, so-called overshooting driving is used in which a voltage to be applied to a liquid crystal element making up a liquid crystal driving circuit is controlled so as to be a voltage being higher than voltage to be applied when a still image is being displayed or a voltage being lower than a voltage to be applied when the still image is being displayed.

FIG. 9 is a diagram showing an example of configurations of a liquid crystal display device of a conventional technology. The liquid crystal display device, as shown in FIG. 9, chiefly includes a frame memory 1, an overshooting control section 2, an LUT (Look Up Table) 3, a timing control section 4, a gate driver 5, a source driver 6, a gray-level value setting section 7, and an active matrix type of liquid crystal panel 8.

The frame memory 1 stores image input signals for every frame according to a clock signal and outputs the signals with a time delay corresponding to one frame period. The overshooting control section 2 selects an overshooting gray-level value stored in the LUT 3 in a manner to correspond to a gray-level value of one past frame of an input signal and a gray-level value of a current frame and outputs the gray-level value according to an input signal and a signal output from the frame memory 1. The LUT 3 is made up of a table-like memory and stores data on overshooting gray-level values corresponding to one past gray-level value and a current gray-level value for every pixel of the liquid crystal panel 8. The timing control section 4 drives the gate driver 5 and the source driver 6 with timing of inputting of a signal according to an output from the overshooting control section 2. The gate driver 5, in response to driving by the timing control section 4, scans gates of a driving TFT (Thin Film Transistor) for each row of pixel lines through address lines in a vertical direction. The source driver 6, in response to driving by the timing control section 4, scans sources of a driving TFT for each column of pixel lines through data lines in a horizontal direction. The gray-level value setting section 7 sets a gray-level voltage for each data line supplied by the source driver 6 according to the operation timing of the source driver 6. The liquid crystal panel 8 displays an image corresponding to an input signal, according to scanning in vertical and horizontal directions, by driving of a pixel connected to a driving transistor mounted at every point of intersections of the address line and data line according to a supplied gray-level voltage.

In the liquid crystal display device shown in FIG. 9, the overshooting control section 2, when an n-th frame input signal and (n−1)-th frame input signal supplied with a time delay corresponding to one frame period by the frame memory 1 are input into the overshooting control 2, outputs, by referring to data stored in the LUT 3, data on an overshooting gray-level value corresponding to one past gray-level value and a current gray-level value for every frame, to the timing control section 4. The timing control section 4 controls operating timing of the gate driver 5 and source driver 6 and supplies data on an overshooting gray-level value output from the overshooting control section 2 for every frame to the source driver 6. This causes a driving transistor corresponding to each pixel formed at every point of the address line and data line in the liquid crystal panel 8 to be sequentially selected according to scanning by the gate driver 5 in a vertical direction and by the source driver 6 in a horizontal direction and to get into an operating state and each pixel to be driven via the driving transistor by a gray-level voltage corresponding to the overshooting gray-level value fed from the gray-level setting section 7 and, as a result, a desired image is displayed on the liquid crystal panel 8.

FIG. 10 is a table showing an example of data in the LUT 3. The LUT 3 contains data stored in the table-like memory which shows overshooting gray-level values corresponding to combinations of each of gray levels including one past gray level and a current gray level each being made up of 0 to 255 gray levels. The LUT 3 shows that, for example, if one past gray-level value is 128 and a current gray-level value still remains 128, the value 128 being the same as the one past gray-level can be provided as the overshooting gray-level value as it is, however, if the one past gray-level value is 128 and a current gray-level value is 64, a value 50 being lower than the current gray-level value should be provided as the overshooting gray-level value, and if the one past gray-level value is 128 and a current gray-level value is 192, a value 200 being higher than the current gray-level value should be provided as the overshooting gray-level value.

FIG. 11 is also a diagram showing another example of configurations of a liquid crystal display device of the conventional technology. The liquid crystal display device shown in FIG. 11 includes a frame memory 1, an overshooting control section 2, an LUT 3, a timing control section 4, a gate driver 5, a source driver 6, a gray-level value setting section 7, a liquid crystal panel 8, and an FRC (Frame Rate Controller) 9. Components other than the FRC 9 in the liquid crystal display device shown in FIG. 11 are the same as those in the liquid crystal display device in FIG. 9. The FRC 9 is configured to change configurations of gray-level values output from the source driver 6 without changing the number of gray levels of an input signal by performing a thinning-out operation on frames in gray-level driving to the source driver 6 to generate halftones. If the thinning-out of frames in the gray-level driving operations is, for example, a thinning-out of frames for ⅓ halftones, the FRC 9 can generate (N−1) gray levels, as a gray level to be output from the source driver 6, which is different by one gray level from N gray levels, by repeatedly exerting control with different timing sequentially for every 3 frames so that N gray levels are made to be (N−3) gray levels, as the gray level to be output from the source driver 6, by performing a frame thinning-out operation once for every three times. Similarly, the FRC 9 can generate (N−2) gray levels, as the gray levels to be output from the source driver 6, which are different by two gray levels from the N gray levels, by repeatedly exerting control with different timing sequentially for every 3 frames so that N gray levels are made to be (N−3) gray levels by performing a frame thinning-out operation twice for every three times by using a method of thinning-out of frames for ⅔ halftones.

Thus, in the liquid crystal display device shown in FIG. 11, halftones can be set as part of the output gray levels by using the FRC 9 having a function of generating halftones. To achieve this, an increase in the number of outputs from the source driver does not occur and, therefore, a rise in costs for the source driver 6 can be avoided.

FIG. 12 is a diagram showing a first example of an overshooting driving method applied to a conventional liquid crystal display device. In FIG. 12, a relation between a liquid panel applied voltage to drive a liquid crystal panel and transmittance through a liquid crystal panel (panel transmittance) is illustrated. Here, the panel transmittance denotes a ratio of light from a backlight transmitted through a panel and of outputting to a front of the panel and, if luminance of the backlight is constant, brightness of a screen is determined by the panel transmittance. Moreover, in FIG. 12, the applied displaying voltages V0, . . . , Vn represent a range of liquid crystal applied voltages in which the liquid crystal panel is driven to obtain brightness of a liquid crystal panel suitable to displaying, which is set according to a specified step (gray level) determined by the number of bits of input signals.

In the case of the overshooting driving method shown in FIG. 12, the applied displaying voltages having a range of V0, . . . , Vn corresponding to the range from its highest gray level to its lowest gray level are the same as the voltages containing corrected voltages for the overshooting driving. Therefore, in the case of transition from a gray level to the highest gray level or to the lowest gray level, there exists no voltage required for the overshooting driving to be added to or subtracted from the applied displaying voltage.

Thus, in the conventional liquid crystal display method shown in FIG. 12, since the applied displaying voltages having a range of V0, . . . , Vn corresponding to the range from the minimum of a panel transmittance to its maximum is the same as the voltages containing corrected voltages for the overshooting driving, in the case of the transition to its highest gray level or its lowest gray level for displaying, the overshooting driving was impossible.

FIG. 13 is a diagram explaining a state of changes in voltages applied to a liquid crystal panel at time of transition of gray levels when applied displaying voltages vary in the conventional liquid crystal driving method shown in FIG. 12, in which states of inverted driving for AC (alternating current) driving are shown on a positive polarity side all together. In FIG. 13, the mark "C" shows a state, as an example, in which a voltage applied to a liquid crystal panel is lowered in a manner to correspond to a decrease in a gray-level value when the applied voltage is at an intermediate level. This shows that, when the applied displaying voltage is lowered from its maximum value Vn to its intermediate value Vx in order to correspond to a decrease in a gray-level value, by performing an overshooting driving operation in which a voltage being lower than the voltage Vx is applied as shown by a solid line in FIG. 13, the voltage to be applied to the liquid crystal panel is set to be the desired displaying voltage Vx during a lapse of one fresh rate (frame rate) period.

On the other hand, the mark "A" shows a case in which a voltage to be applied to a liquid crystal panel is changed to the maximum value of an applied displaying voltage. When the applied displaying voltage is increased from its intermediate Vy to its maximum value Vn to correspond to changes in gray-level values, since there is no voltage on which the overshooting operation is to be performed, only the change in the voltage to be applied to the liquid crystal panel from Vy, . . . , Vn occurs. Due to this, the change in the voltage to be applied to the liquid crystal panel is not complete during the lapse of one fresh rate and, as a result, a remaining change in the voltage to be applied to the liquid crystal panel occurs during a subsequent refresh period. Therefore, when images are changed in displaying of moving images, a trail leaving phenomenon in which an image leaves a trail occurs. Moreover, the mark B shows the case in which the applied displaying voltage is changed to be the minimum value and, when the applied displaying voltage is lowered from its intermediate voltage Vx to its maximum value V0 to correspond to changes in gray-level values, since there is no voltage on which the overshooting operation is to be performed, only the change in the voltage to be applied to the liquid crystal panel from Vx, . . . , V0 occurs. Due to this, the change in the voltage to be applied to the liquid crystal panel is not complete during the lapse of one fresh rate and, as a result, a remaining change in the voltage to be applied to the liquid crystal panel occurs during a subsequent refresh period and, therefore, when a moving image is displayed, as in the case shown by the mark A, a trail leaving phenomenon in which an image leaves a trail occurs.

FIG. 14 is a diagram showing a second example of the overshooting driving method applied to the conventional liquid crystal display device. In the overshooting driving method shown in FIG. 14, a voltage corresponding to one gray-level value in the lowest level out of the applied displaying voltages V0, . . . , Vn and a voltage corresponding to one gray-level value in the highest level out of the applied voltages V0, . . . , Vn are assigned to voltages to be used only for overshooting driving, and the intermediate voltage range, except for voltages to be used only for overshooting driving, is used as displaying voltages.

In the conventional liquid crystal driving method shown in FIG. 14, it is possible that the overshooting driving operation is performed in a manner to correspond to all voltages within the applied displaying voltages, however, as a result of assigning parts of the applied voltages range to voltages to be used only for overshooting driving, a narrowed range of the applied displaying voltages causes a narrow dynamic range of display gray-level values in the liquid crystal panel, thus resulting in a decrease in image contrast.

Thus, in the liquid crystal driving method shown in FIG. 12, in the case of transition to the highest gray-level value or the lowest gray-level value, the overshooting operation is impossible, causing the occurrence of the trail leaving phenomenon at time of displaying moving images. Also, in the conventional liquid crystal driving method shown in FIG. 14, part of the display gray-level values is assigned for the overshooting operation and, by using this part, the overshooting operation is performed at time of the transition to the highest gray level or lowest gray level, however, the decrease in the number of gray-level values causes a narrow dynamic range of display gray-level values of the liquid crystal panel and, as a result, image contrast is lowered.

To solve this problem, a liquid crystal display device is disclosed in Patent Reference 1 (Japanese Patent Application Laid-open No. 2003-172915) in which a liquid crystal panel is designed so that, in the voltage—transmittance characteristic, the transmittance show its extreme value at a voltage exceeding the highest gray-level value and, by setting a voltage for overshooting driving to be higher than the voltage showing the extreme value of the transmittance, the rising state of the liquid crystal display device is improved and in which, at time of the overshooting operation for the transition to the highest gray-level displaying, the transmittance of the liquid crystal panel first reaches its extreme value and then transmittance level corresponding to the overshooting voltage.

However, an original purpose of the overshooting driving operation is to solve the problem that, due to viscosity of a liquid crystal substance, a change in its optical transmittance through a liquid crystal panel does not keep track of a change in voltages applied to a liquid crystal panel. Therefore, if the transmittance of the liquid crystal substance changes by keeping track of an applied voltage in such a way as described in the Patent Reference 1, the overshooting driving is not necessary. Moreover, in a normally-black liquid crystal panel such as an IPS (In Plane Switching)-type liquid crystal panel, when a voltage exceeding the maximum gray-level voltage is applied to its panel, the transmittance of the liquid crystal substance takes its extreme value. If a liquid crystal molecule is made to move up to a state in which the extreme value of the transmittance is exceeded, a liquid crystal molecule with a state in which the liquid crystal substance rotates in a reverse direction becomes stable at an end of a pixel structure of the liquid crystal element or a like, thus resulting in a defect of a tinny luminous dot within a pixel, color persistence on a screen and/or lowering in luminance. Therefore, application of the overshooting driving operation to the liquid crystal panel is impossible.

Also, another liquid crystal display device is disclosed in Patent Reference 2 (Japanese Patent Application Laid-open No. 2004-061692) in which a liquid crystal controller LSI (Large Scale Integrated Circuit) to control displaying of a liquid crystal panel includes a display control circuit having image memory to store image data input from an outer signal source, a liquid crystal driving voltage generating circuit having a reference voltage calibrating circuit and a data electrode driving circuit to supply image data stored in an image memory to a data electrode, wherein the first common grounding lines including grounding lines of the reference voltage calibrating circuit contained in the liquid crystal driving circuit and grounding lines of a scanning electrode circuit to receive a voltage from the liquid crystal driving circuit and of the data electrode driving circuit and the second grounding lines including a grounding line of image memory are arranged in a separated manner in the liquid crystal controller LSI so that degradation of display quality caused by noises and changes in voltage can be avoided. However, the technology disclosed in the Patent Reference 2 is the invention related to configurations of the reference voltage generating section in the liquid crystal controller LSI and is not related directly to the present invention.

Also, a flat panel displaying method and a flat panel display device are disclosed in Patent Reference 3 (Japanese Patent Application Laid-open No. Hei 07-334131) in which, through processing by an FRC, when still images are displayed, the first and second luminance being different from each other are sequentially assigned to display data that should be displayed as halftone display in predetermined number of pixels in a line and second and first luminance being opposite in order are sequentially assigned to display data that should be displayed as halftone display in a subsequent frame and, when moving images are displayed, the first luminance is assigned to display data that should be displayed as halftone display in pixels in an absolute position on a predetermined display screen in a frame and the second luminance is assigned in a subsequent frame, thereby preventing the occurrence of a flicker in the still images and making it possible to achieve correct gray-level display. However, the technology disclosed in the Patent Reference 3 is related to the processing by the FRC itself and is not directly contributable to the solution of problems associated with the conventional liquid crystal driving method.

SUMMARY OF THE INVENTION

In view of the above, it is an object of the present invention to provide a liquid crystal driving device which enable an overshooting driving operation even in the transition to a highest gray level or to a lowest gray level for gray-level display without being limited by characteristics of a liquid crystal panel to which the overshooting driving is applied and which can prevent a defect of a tinny luminous dot in a pixel, color persistence on a screen, and lowering in luminance even by applying a voltage exceeding an extreme value of transmittance of a liquid crystal panel.

According to a first aspect of the present invention, there is provided a liquid crystal driving device including:

a liquid crystal panel whose transmittance changes depending on an applied voltage; and a driver to apply a voltage for displaying set according to a gray level of an input signal to the liquid crystal panel with timing determined by an input signal;

wherein, the driver applies an overshooting driving voltage for transition to a higher voltage, when a voltage for displaying to be applied to the liquid crystal panel is controlled so as to be a highest-level voltage out of the voltages for displaying corresponding to a range of input gray levels, which is added to a voltage side being higher than the highest-level voltage out of the voltages for displaying, to the liquid crystal panel; and wherein, the driver applies an overshooting driving voltage for transition to a lower voltage, when a voltage for displaying to be applied to the liquid crystal panel is controlled so as to be the lowest-level voltage out of the voltages for displaying corresponding to a range of input gray levels, which is added to a voltage side being lower than the lowest-level voltage out of the voltages for displaying, to the liquid crystal panel.

In the foregoing first aspect, a preferable mode is wherein the overshooting voltages for transition to a higher voltage and for transition to a lower voltage are set independently from the voltages for displaying.

Also, a preferable mode is one that wherein further includes an FRC, wherein the voltages for displaying for halftones corresponding to the number of voltages for input gray levels being in short supply caused by setting of the overshooting driving voltages for transition to a higher voltage and for transition to a lower voltage are generated, by using the FRC, from the voltages for displaying corresponding to higher and lower gray levels of halftones being in short supply.

According to a second aspect of the present invention, there is provided a liquid crystal driving device including:

a liquid crystal panel whose transmittance changes depending on an applied voltage; and a driver to apply a voltage for displaying set according to a gray level of an input signal to the liquid crystal panel with timing determined by an input signal;

wherein the driver applies an overshooting driving voltage for transition to a higher (or lower) voltage, when the voltage for displaying to be applied to the liquid crystal panel is controlled so as to be a highest-level (or lowest-level) voltage out of voltages for displaying corresponding to a range of input gray levels, which is added to a voltage side being higher (or lower) than the highest-level (or lowest-level) voltage out of the voltages for displaying to the liquid crystal panel wherein the driver controls the voltages for displaying being higher (or lower) by voltages corresponding to m (m is a natural number) gray levels from the lowest-level (or highest-level) voltage, when a voltage for displaying to be applied to the liquid crystal panel is controlled so as to be a lowest-level (or highest-level) voltage out of the voltages for displaying corresponding to a range of input gray levels; and wherein the driver uses voltages between a voltage being higher (or lower) by voltages corresponding to m gray levels from the lowest-level (or highest-level) voltage and the lowest-level (or highest-level) voltage as an overshooting driving voltage for a transition to a lower (or higher) voltage.

In the foregoing second aspect, a preferable mode is wherein the overshooting voltage for transition to a higher (or lower) voltage is set independently from the voltages for displaying.

Also, a preferable mode is one that wherein further includes an FRC, wherein the voltages for displaying for halftones corresponding to the number of voltages for input gray levels being in short supply caused by setting of the overshooting driving voltages for transition to a higher voltage and for transition to a lower voltage are generated, by using the FRC, from the voltages for displaying corresponding to higher and lower gray levels of halftones being in short supply.

According to a third aspect of the present invention, there is provided a liquid crystal driving device including:

a liquid crystal panel whose transmittance changes depending on an applied voltage; and a driver to apply a voltage for displaying set according to a gray level of an input signal to the liquid crystal panel with timing determined by an input signal;

wherein the driver applies an overshooting driving voltage for transition to a higher (or lower) voltage, when a voltage for displaying to be applied to the liquid crystal panel is controlled so as to be a highest-level (or lowest-level) voltage out of voltages for displaying corresponding to a range of input gray levels, which is added to a voltage side being higher (or lower) than the highest-level (or lowest-level) voltage out of the voltages for displaying, to the liquid crystal panel;

wherein, when a voltage for displaying to be applied to the liquid crystal panel is controlled so as to be a lowest-level (or highest-level) voltage out of the voltages for displaying corresponding to a range of input gray levels, no overshooting driving operation is performed.

In the foregoing third aspect, a preferable mode is wherein the overshooting voltage for transition to a higher (or lower) voltage is set independently from the voltages for displaying.

Also, a preferable mode is one that wherein further includes an FRC, wherein the voltages for displaying for halftones corresponding to the number of voltages for input gray levels being in short supply caused by setting of the overshooting driving voltages for transition to a higher voltage and for transition to a lower voltage are generated, by using the FRC, from the voltages for displaying corresponding to higher and lower gray levels of halftones being in short supply.

According to a fourth aspect of the present invention, there is provided a liquid crystal driving device including:

an active matrix type of liquid crystal panel whose transmittance changes depending on an applied voltage; and a source driving unit to apply a voltage for displaying set according to a gray level of an input signal to the liquid crystal panel with timing determined by an input signal, the voltage for displaying applied to a source electrode of a thin film transistor corresponding to a picture element making up the liquid crystal panel;

wherein, the source driving unit applies an overshooting driving voltage for transition to a higher voltage, when the voltage for displaying to be applied to the liquid crystal panel is controlled so as to be a highest-level voltage out of voltages for displaying corresponding to a range of input gray levels, which is added to a voltage side being higher than the highest-level voltage out of the voltages for displaying, to the liquid crystal panel; and wherein, the source driving unit applies an overshooting driving voltage for transition to a lower voltage, when the voltage for displaying to be applied to the liquid crystal panel is controlled so as to be the lowest-level voltage out of voltages for displaying corresponding to a range of input gray levels, which is added to a voltage side being lower than the lowest-level voltage out of the voltages for displaying, to the liquid crystal panel.

According to a fifth aspect of the present invention, there is provided a liquid crystal driving device including:

an active matrix type of liquid crystal panel whose transmittance changes depending on an applied voltage; and a source driving unit to apply a voltage for displaying set according to a gray level of an input signal to the liquid crystal panel with timing determined by an input signal, the voltage for displaying applied to a source electrode of a thin film transistor corresponding to a picture element making up the liquid crystal panel;

wherein the source driving unit applies an overshooting driving voltage for transition to a higher (or lower) voltage, when the voltage for displaying to be applied to the liquid crystal panel is controlled so as to be a highest-level (or lowest-level) voltage out of voltages for displaying corresponding to a range of input gray levels, which is added to a voltage side being higher (or lower) than the highest-level (or lowest-level) voltage out of the voltages for displaying to the liquid crystal panel wherein the source driving unit controls the voltages for displaying being higher (or lower) by voltages corresponding to m (m is a natural number) gray levels from the lowest-level (or highest-level) voltage, when the voltage for displaying to be applied to the liquid crystal panel is controlled so as to be a lowest-level (or highest-level) voltage out of the voltages for displaying corresponding to a range of input gray levels; and wherein the source driving unit uses voltages between a voltage being higher (or lower) by voltages corresponding to m gray levels from the lowest-level (or highest-level) voltage and the lowest-level (or highest-level) voltage as an overshooting driving voltage for a transition to a lower (or higher) voltage.

According to a sixth aspect of the present invention, there is provided a liquid crystal driving device including:

an active matrix type of liquid crystal panel whose transmittance changes depending on an applied voltage; and a source driving unit to apply a voltage for displaying set according to a gray level of an input signal to the liquid crystal panel with timing determined by an input signal, the voltage for displaying applied to a source electrode of a thin film transistor corresponding to a picture element making up the liquid crystal panel;

wherein the source driving unit applies an overshooting driving voltage for transition to a higher (or lower) voltage, when the voltage for displaying to be applied to the liquid crystal panel is controlled so as to be a highest-level (or lowest-level) voltage out of voltages for displaying corresponding to a range of input gray levels, which is added to a voltage side being higher (or lower) than the highest-level (or lowest-level) voltage out of the voltages for displaying, to the liquid crystal panel;

wherein, when the voltage for displaying to be applied to the liquid crystal panel is controlled so as to be a lowest-level (or highest-level) voltage out of the voltages for displaying corresponding to a range of input gray levels, no overshooting driving operation is performed.

With the above configurations, it is made possible to perform an overshooting driving operation in transition among all gray levels including transition to the highest gray level and to the lowest gray level for displaying, which enables higher response speed for displaying and part of voltages in a range of the voltages for displaying is not used for the overshooting driving, which enables prevention from a narrowed dynamic range of gray levels for displaying and from lowering in contrast of displayed images.

With still another configuration, a voltage for the overshooting driving can be set independently from a voltage for displaying, which can avoid an influence by gray-level value setting caused by use of the voltages for displaying on a gamma curve.

With still another configuration, an added overshooting voltage in a transition to the highest gray level is allowed to be set to a voltage at which tracking of transmittance of the liquid crystal panel at time of transition to the highest gray level is complete within one frame and the overshooting voltage has no relation to a voltage having an extreme value, which enables application of the present invention to a liquid crystal panel having any characteristic.

With still another configuration, even if a voltage exceeding an extreme value of transmittance of the liquid crystal panel is applied, neither reverse rotation of a liquid crystal substance caused by its viscosity nor a stable state of the liquid crystal element with the liquid crystal being rotated in a reverse direction occurs, which can prevent the occurrence of tinny luminous dot defect in a pixel, color persistence on a screen, and lowering in luminance.

BRIEF DESCRIPTION OF THE DRAWINGS

The above and other objects, advantages, and features of the present invention will be more apparent from the following description taken in conjunction with the accompanying drawings in which:

FIG. 10 is a table showing an example of data in an LUT;

DETAILED DESCRIPTION OF THE PREFERRED EMBODIMENTS

Best modes of carrying out the present invention will be described in further detail using various embodiments with reference to the accompanying drawings. In a liquid crystal panel whose transmittance changes depending on a voltage applied to the liquid crystal panel, when a voltage for displaying to be applied to a liquid crystal panel is controlled so as to be the highest-level value Vn out of the voltages for displaying V0, . . . , Vn corresponding to an input gray level range, an overshooting driving voltage VH for transition to a higher voltage which is added to a voltage side being higher than the highest-level value Vn of the voltages for displaying is applied to a liquid crystal panel and, when the voltage for displaying to be applied to the liquid crystal panel is controlled so as to be the lowest-level value V0 out of the voltages for displaying V0, . . . , Vn corresponding to the input gray level range, an overshooting driving voltage VL for transition to a lower voltage which is added to a voltage side being lower than the lowest-level value V0 out of the voltages for displaying is applied to the liquid crystal panel.

First Embodiment

Figure 1:
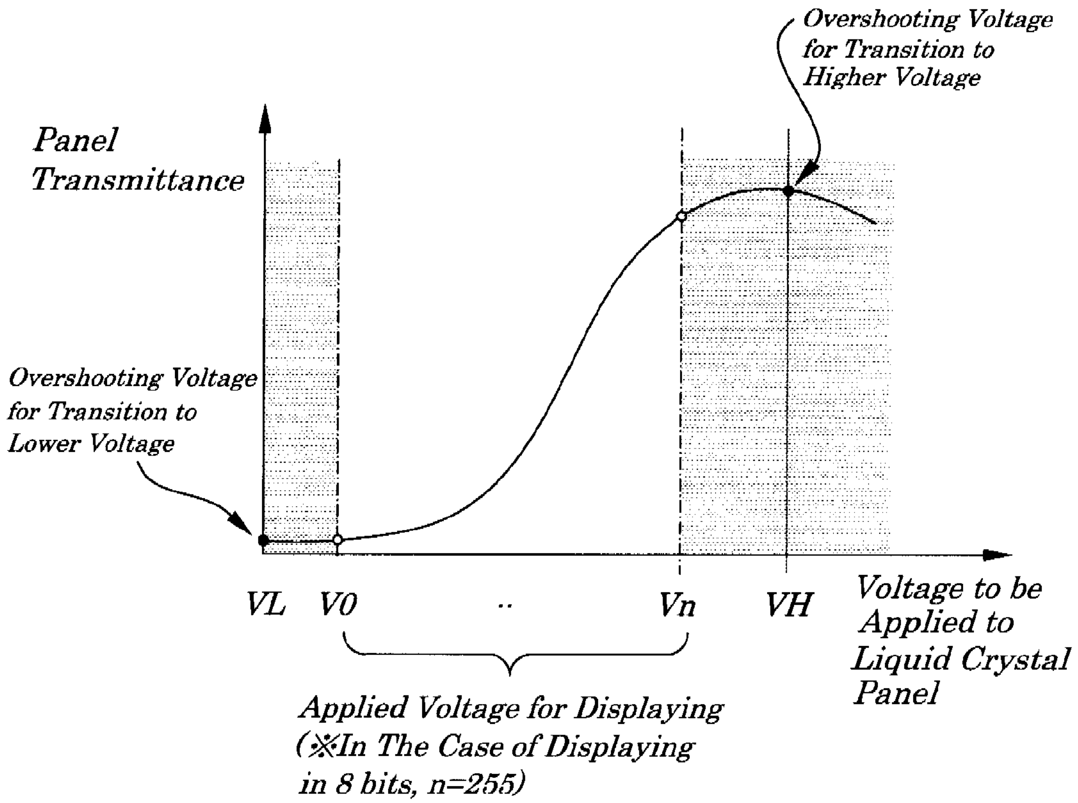
FIG. 1 is a diagram showing a method for driving a liquid crystal panel used in a liquid crystal driving device according to a first embodiment of the present invention.
Figure 2A:
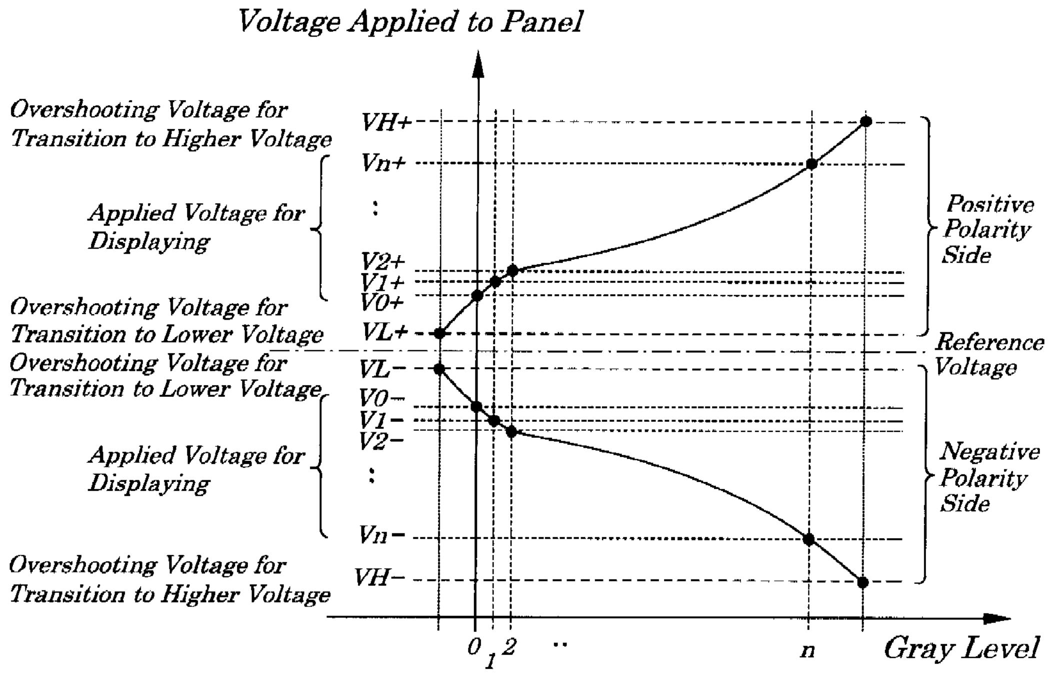
FIGS. 2A and 2B are diagrams showing a relation between a panel applied voltage and display gray level according to the first embodiment of the present invention.
Figure 2B:
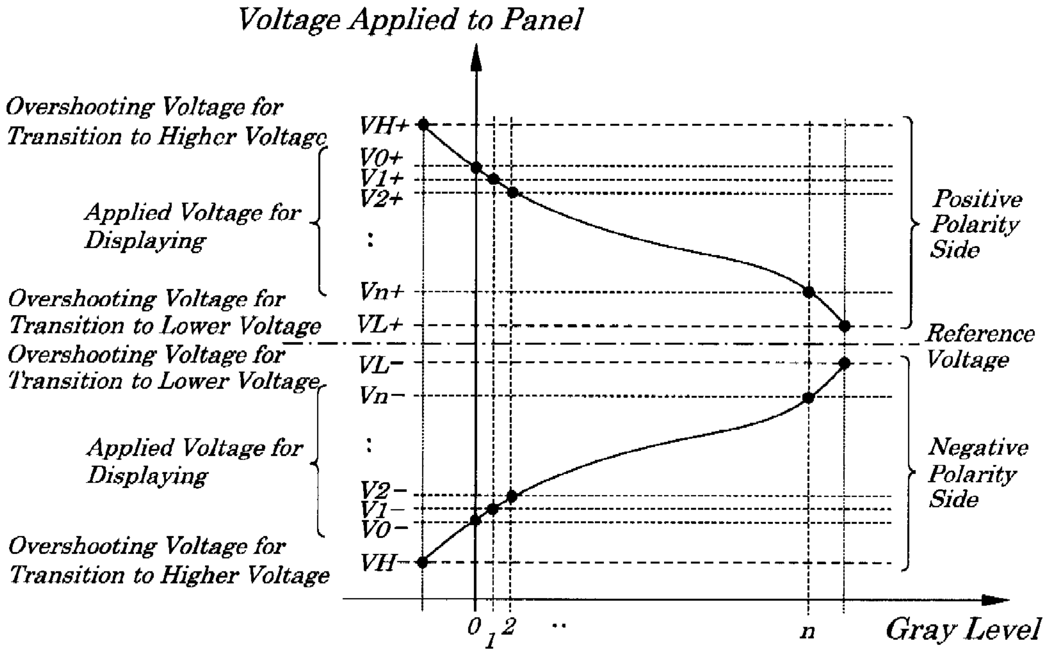
Figure 3:
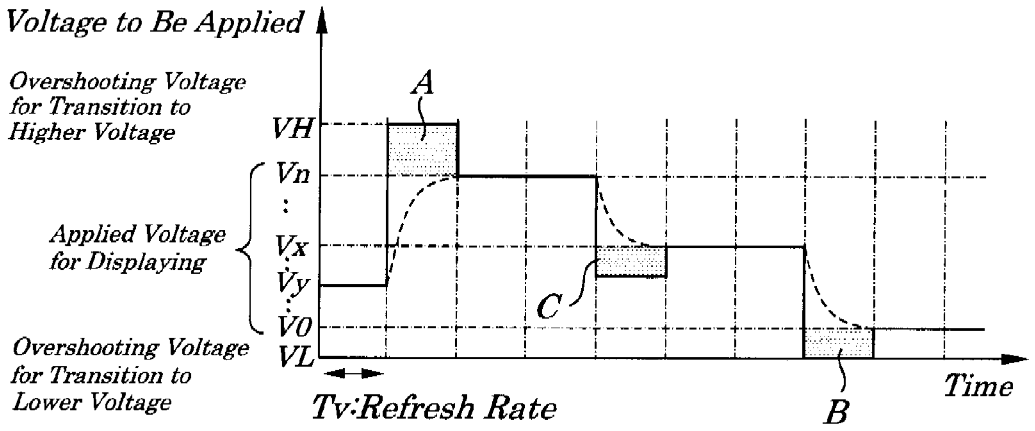
FIG. 3 is a diagram showing, as an example, a state of changes in voltages applied to a liquid crystal panel during a transition of gray level when voltages for displaying are different from one another in the method of driving the liquid crystal panel according to the embodiment of the present invention.
Figure 4:
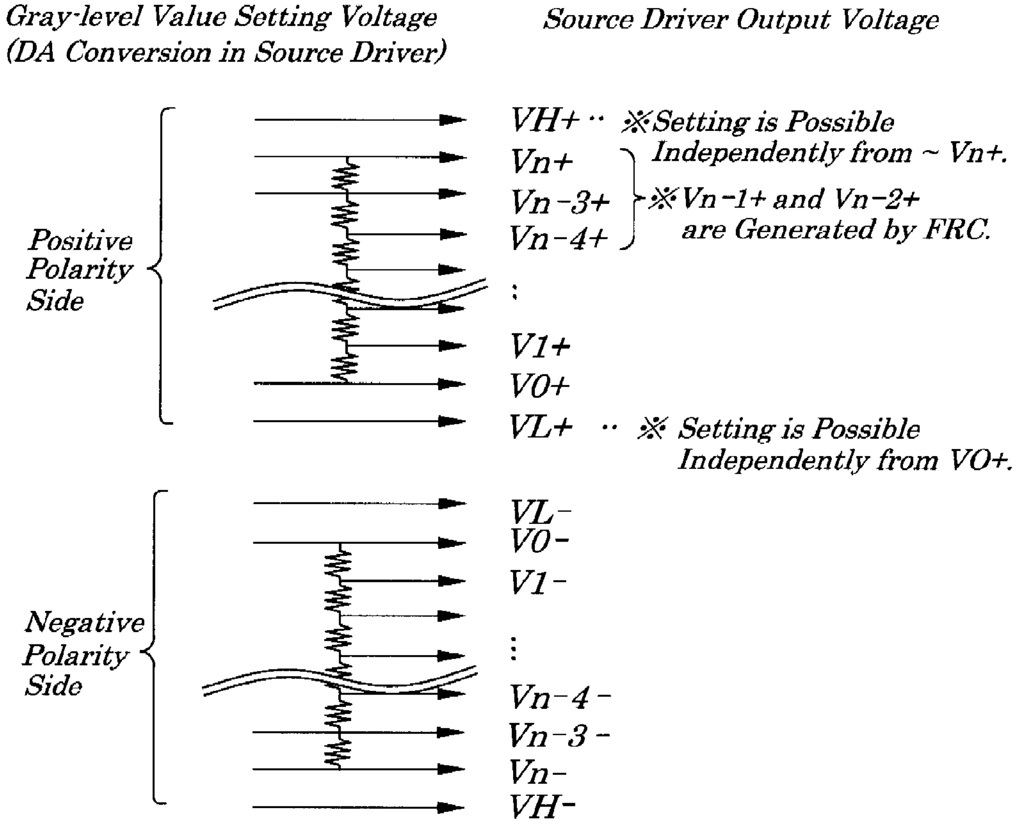
FIG. 4 is a diagram explaining a relation between a gray-level value setting voltage and a source driver output voltage according to the embodiment of the present invention.

FIG. 1 is a diagram showing a method for driving a liquid crystal of a first embodiment of the present invention. FIGS. 2A and 2B are diagrams showing a relation between voltages applied to a liquid crystal panel and display gray level of the first embodiment. FIG. 3 is a diagram showing, as an example, a state of changes in voltages applied to a liquid crystal panel during a transition of gray level when voltages for displaying are different from one another in the method of driving the liquid crystal of the embodiment. FIG. 4 is a diagram explaining a relation between a gray-level value setting voltage and a source driver output voltage of the embodiment.

In the liquid crystal driving method, as shown in FIG. 1, in addition to voltages for displaying V0, . . . , Vn, as a voltage to be applied to a liquid crystal panel, an overshooting voltage VH for transition to a higher voltage is set in a voltage range being higher than a limit voltage Vn of the voltages for displaying and an overshooting voltage VL. for transition to a lower voltage is set in a voltage range being lower than a limit voltage V0 of the voltages for displaying.

FIGS. 2A and 2B are diagrams explaining, in detail, a relation between voltages to be applied to a liquid crystal panel and to be used for displaying and gray levels for displaying and FIG. 2A shows a case of a normally black mode in which black is displayed with no image being input and FIG. 2B shows a case of a normally white mode in which white is displayed with no image being input. The relation between voltages to be applied to a liquid crystal panel and panel transmittance shown in FIG. 1 can be interpreted as the relation between voltages to be applied to a liquid crystal panel and gray levels for displaying.

Generally, for driving a liquid crystal, in order to prevent a DC (Direct Current) voltage from being applied to a liquid crystal, a voltage Vn+ on a side of a voltage higher than a reference voltage and a voltage Vn− on a side of a voltage being lower than the reference voltage are alternately applied to the liquid crystal so that a voltage corresponding to a differential from the reference voltage is used as a voltage to be applied to the liquid crystal panel.

Therefore, in the case of the normally black mode panel shown in FIG. 1 described above, as shown in FIG. 2A, an overshooting voltage VH+ for transition to a higher voltage is set at a voltage range being higher than an upper limit voltage Vn+ of a voltage for displaying and an overshooting voltage for transition to a lower voltage is set at a range between a lowest limit voltage V0+ and the reference voltage and, on a side of a voltage being lower than the reference voltage, an overshooting voltage VH− for transition to a higher voltage is set at a voltage range being lower than a lowest limit voltage Vn− of an applied voltage and an overshooting voltage VL− for transition to a lower voltage is simply set at a range between a lowest limit voltage V0− and the reference voltage.

Moreover, the relation between a voltage applied to a liquid crystal panel and display gray level, in the case of normally white mode, is reverse to the relation between a voltage applied to the liquid crystal panel and transmittance and, therefore, as shown in FIG. 2B, by inverting the relation between a gray level and a voltage applied for displaying, for example, a voltage V (n−m)+ or a voltage V (n−m)− is simply applied to display m-gray levels.

As shown by the example in FIG. 1 to FIGS. 2A and 2B, according to the liquid crystal driving method of the embodiment, it is possible to perform an overshooting driving operation in transition among all gray levels including transition to a highest gray level and to a lowest gray level, thus increasing a response speed of the liquid crystal display device.

Figure 13:
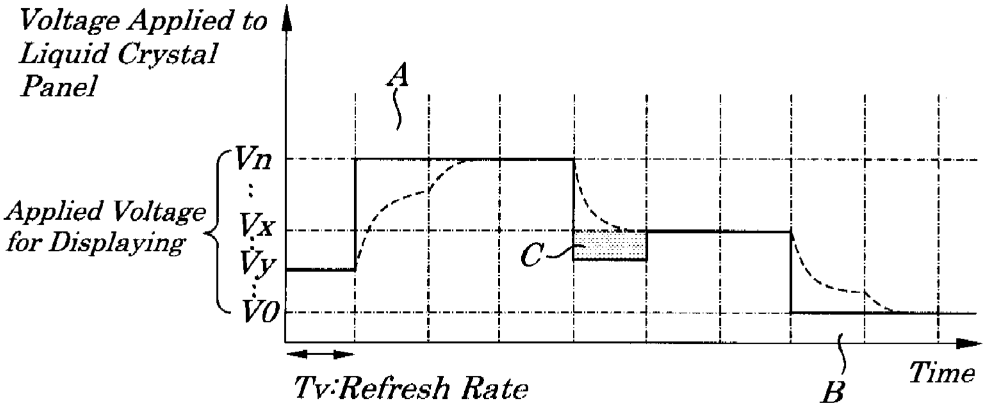
FIG. 13 (RELATED ART)
FIG. 13 is a diagram explaining a state of changes in voltages applied to a liquid crystal panel at time of transition of gray levels when voltages for displaying vary in the conventional liquid crystal driving method shown in FIG. 12.
Figure 14:
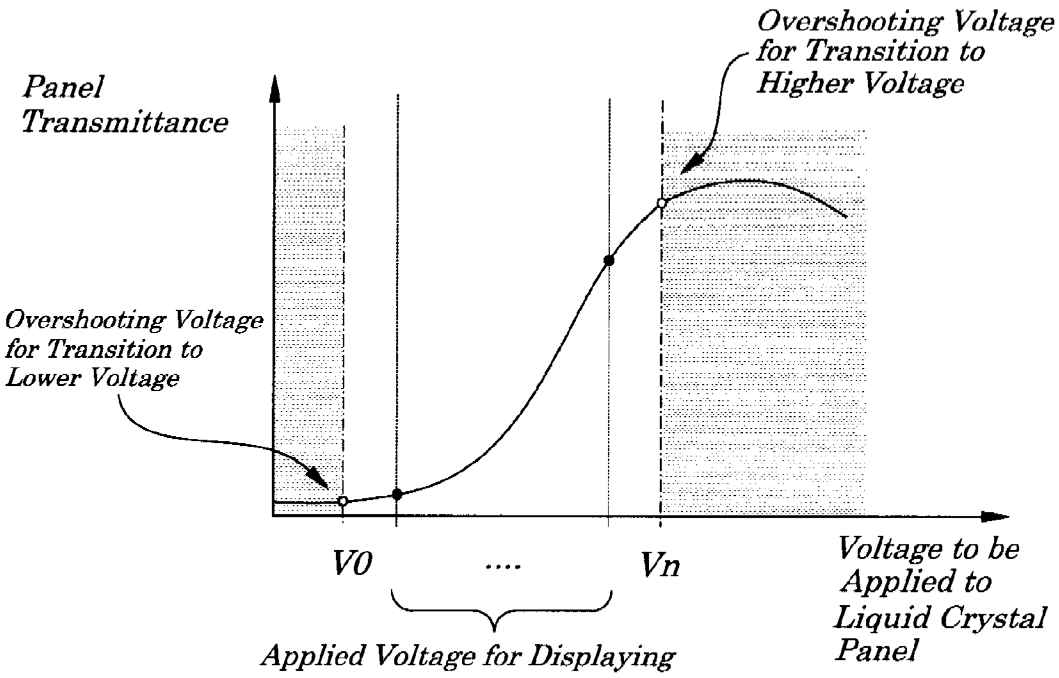
FIG. 14 (RELATED ART)
FIG. 14 is a diagram showing a second example of an overshooting driving method applied to the conventional liquid crystal display device.

FIG. 3 shows, as an example, a state of changes in voltages applied to a liquid crystal panel at time of transition of gray levels when voltages for displaying are different from one another in the liquid crystal driving method of the embodiment, wherein states of inverted driving in the case of AC driving are shown in the positive side all together. The mark C portion shows an example of a drop of the voltage to be applied to a liquid crystal panel in response to a decrease in gray level values in the range of voltages for displaying; that is, when the applied displaying voltage is made to lower from its maximum value Vn to its intermediate value Vx in response to a decrease in gray-level values, by performing an overshooting operation in which a voltage being lower than Vx shown by the solid line is applied, the voltage to be applied to the liquid crystal panel is set to be a desired voltage Vx during a lapse of one refresh rate (frame rate) period, as in the case of the conventional liquid crystal driving method shown in FIG. 13.

On the other hand, the mark A portion shows a case in which a voltage to be applied to the liquid crystal panel is changed to be the maximum value Vn of the applied displaying voltage. When the voltage to be applied to the liquid crystal panel is raised from its intermediate value Vy to its maximum value vn, an overshooting driving by using an overshooting voltage VH for transition to a higher voltage as shown by a solid line and, therefore, the applied displaying voltage reaches the voltage Vn within one refresh rate period. As a result, even when moving images are displayed, states of the images remain unchanged, which can prevent the occurrence of the trail leaving phenomenon. Furthermore, the mark B portion shows a case in which a voltage to be applied to the liquid crystal panel is changed to be its minimum value V0 out of the applied displaying voltage. When the voltage to be applied to the liquid crystal panel is lowered from its intermediate value Vx to its minimum value V0, an overshooting driving by using an overshooting voltage VL for transition to a lower voltage as shown by a solid line and, therefore, the applied voltage for displaying reaches the voltage V0 within one refresh rate period. As a result, even when moving images are displayed, states of the images remain unchanged, which can prevent the occurrence of the trail leaving phenomenon.

Figure 11:
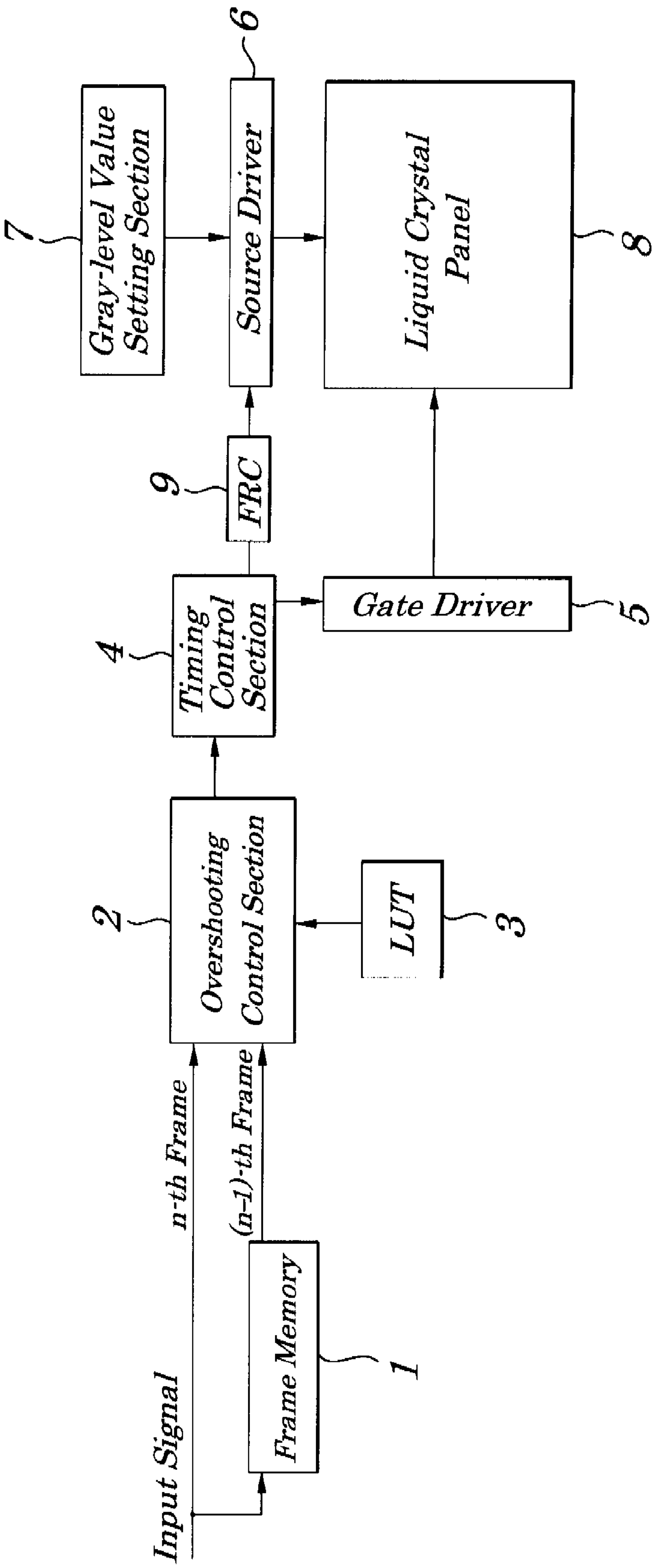
FIG.11 (RELATED ART)
FIG. 11 is a diagram for showing another example of configurations of a liquid crystal display device of the conventional technology.
Figure 12:
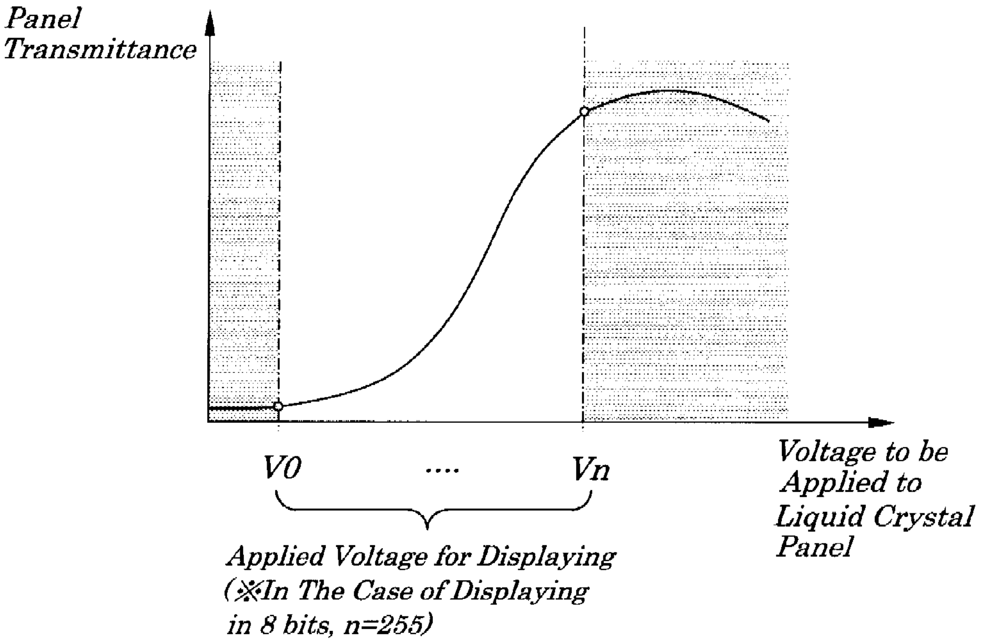
FIG. 12 (RELATED ART)
FIG. 12 is a diagram showing a first example of an overshooting driving method applied to a conventional liquid crystal display device.

In the case of the liquid crystal driving method shown in FIG. 1, it is necessary to set not only voltages for displaying V0, . . . , Vn, which are voltages for setting gray-level values, but also an overshooting voltage VL for transition to a lower voltage and an overshooting voltage VH for transition to a higher voltage independently. Now, if input signals are 8-bit signals, the number of outputs to be generated by analog-digital (A/D) conversion of input signals in the source driver 6 is limited to 256 and if two out of the outputs are used for setting the overshooting voltage VL for transition to a lower voltage and as the overshooting voltage VH for transition to a higher voltage, the number of outputs that can be used as the applied displaying voltage becomes in short supply. In this case, by activating the FRC 9 shown in FIG. 11 to use the halftone output voltages generated by performing a frame thinning-out operation on two outputs from the source driver as the lacking outputs from the source driver, the number of outputs can be made up for.

As shown by an example in FIG. 4, according to the liquid crystal display device to perform an AC driving operation, voltages for displaying V0+, . . . , Vn−3+, Vn−2+, Vn−1+, Vn+ corresponding to the number of gray levels are once generated as outputs from the source driver 6 on a positive polarity side which are obtained by performing digital-analog (DA) conversion on digital data making up input signals in the source driver 6, but, for example, the voltages Vn−1+ and Vn−2+ are not used and, instead, an overshooting voltage VL+ for transition to a lower voltage and an overshooting voltage VH+ for transition to a higher voltage, both of which are independently set by the gray-level value setting section, are inserted. Then, by inserting the voltages Vn−1+ and Vn−2+, both of which are generated by the FRC 9 shown in FIG. 11 using the voltages Vn+ and Vn−3+, output voltages VL+, V0+, . . . , Vn−3+, Vn−2+, Vn−1+, Vn+, VH+ are applied to the liquid crystal panel 8, which contain the overshooting voltage VL+ for transition to a lower voltage and the overshooting voltage VH+ for transition to a higher voltage, Similarly, output voltages VL−, V0−, . . . , Vn−4−, Vn−3−, Vn−2−, Vn−1−, Vn−, VH+ are applied to the liquid crystal panel 8, which contain the overshooting voltage VL− for transition to a lower voltage and the overshooting voltage VH− for transition to a higher voltage, both being set independently in the gray-level value setting section 7 as outputs from the source driver 6 on a negative side and which contain the voltages for displaying Vn−1− and Vn−2−, both being generated by the FRC 9 from the displaying voltages for displaying Vn− and Vn−3−.

Thus, by employing the liquid crystal driving method shown in FIG. 4, it is possible to set gray level values in a manner to correspond to the applied voltages V0, . . . , Vn and to realize the overshooting driving for transition to the minimum value V0 and to the maximum value Vn out of the voltages for displaying. According to this method, the shortage of source driver outputs that occurs due to use of part of the number of applied displaying outputs generated based on input signals for voltages for overshooting driving is made up for by output voltages generated by the FRC as outputs for halftones and, therefore, it is not necessary to raise an operating clock frequency of the source driver to increase the number of gray-level values, which can prevent a rise in costs of the source driver. Moreover, the voltages to be generated by using the FRC are not limited to the voltages Vn−2 and Vn−1 employed in the above embodiment and may be other two voltages. The voltages to be generated by using the FRC are not limited to continuous two voltages employed in the above embodiment and may be discrete two voltages.

Second Embodiment

Figure 5:
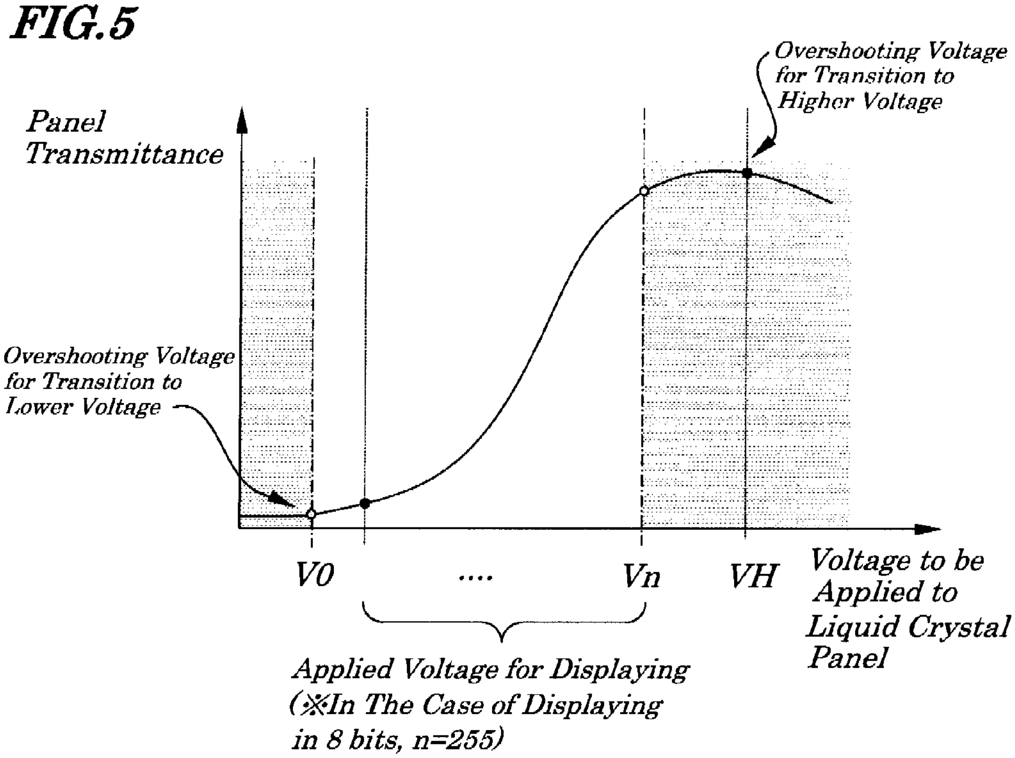
FIG. 5 is a diagram showing a method for driving a liquid crystal panel according to a second embodiment of the present invention.

FIG. 5 is a diagram showing a method for driving a liquid crystal panel according to the second embodiment of the present invention. In the method for driving a liquid crystal panel according to the second embodiment, as shown in FIG. 5, as a voltage to be applied to a liquid crystal panel, in addition to voltages for displaying V0, . . . , Vn, a voltage for overshooting driving for transition to a higher voltage is set in only the range of voltages being higher than an upper limit Vn in the range of the voltages for displaying and, when the voltage to be applied to the liquid crystal panel is changed to the maximum value Vn of the applied voltage for displaying, an overshooting driving operation using the voltage VH is performed. On the other hand, for example, the voltage V0−1 is used for displaying which is the lower limit of the applied displaying voltage and by which a displaying range is made narrow and an overshooting driving operation is performed by using the voltage V0 as the voltage for overshooting driving for transition to a lower voltage. The overshooting driving voltage for transition to a lower voltage is not limited to a voltage corresponding to one gray level and may be an applied displaying voltage to correspond to m ("m" is a natural number) gray levels.

According to the method of the second embodiment, an overshooting driving operation is made possible for transition among all gray levels, except gray levels near to the lowest gray level, including transition to the highest gray level for displaying and, therefore, a response speed of the liquid crystal display device can be increased, however, a gray level range in which display is possible is made somewhat narrow.

Third Embodiment

Figure 6:
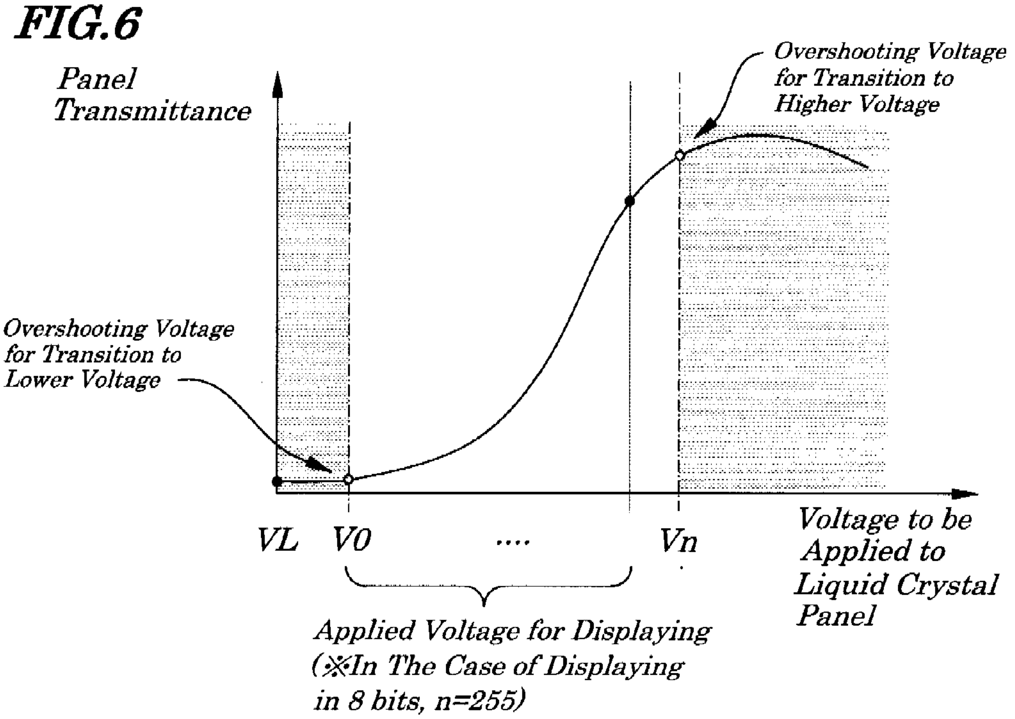
FIG. 6 is a diagram showing a method for driving a liquid crystal panel according to a third embodiment of the present invention.

FIG. 6 is a diagram showing a method for driving a liquid crystal panel according to the third embodiment of the present invention. In the method for driving a liquid crystal panel according to the third embodiment, as shown in FIG. 6, as a voltage to be applied to a liquid crystal panel, in addition to voltages for displaying V0, . . . , Vn, a voltage VL for overshooting driving for transition to a lower voltage is set in only the range of voltages being higher than a lower limit V0 in the range of the voltages for displaying and, when the voltage to be applied to the liquid crystal panel is changed to the minimum value V0 of the applied displaying voltage, an overshooting driving operation using the voltage VL is performed. On the other hand, for example, the voltage Vn−1 is used for displaying which is an upper limit of the voltages for displaying and by which a displaying range is made narrow and an overshooting driving operation is performed by using the voltage Vn as the voltage for overshooting driving for transition to a lower voltage. The overshooting driving voltage for transition to a higher voltage is not limited to a voltage corresponding to one gray level and may be an applied displaying voltage to correspond to m ("m" is a natural number) gray levels.

According to the method of the third embodiment, an overshooting driving operation is made possible for transition among all gray levels, except gray levels near to the highest gray level, including transition to the lowest gray level for displaying and, therefore, a response speed of the liquid crystal display device can be increased, however, a gray level range in which display is possible is made somewhat narrow.

Fourth Embodiment

Figure 7:
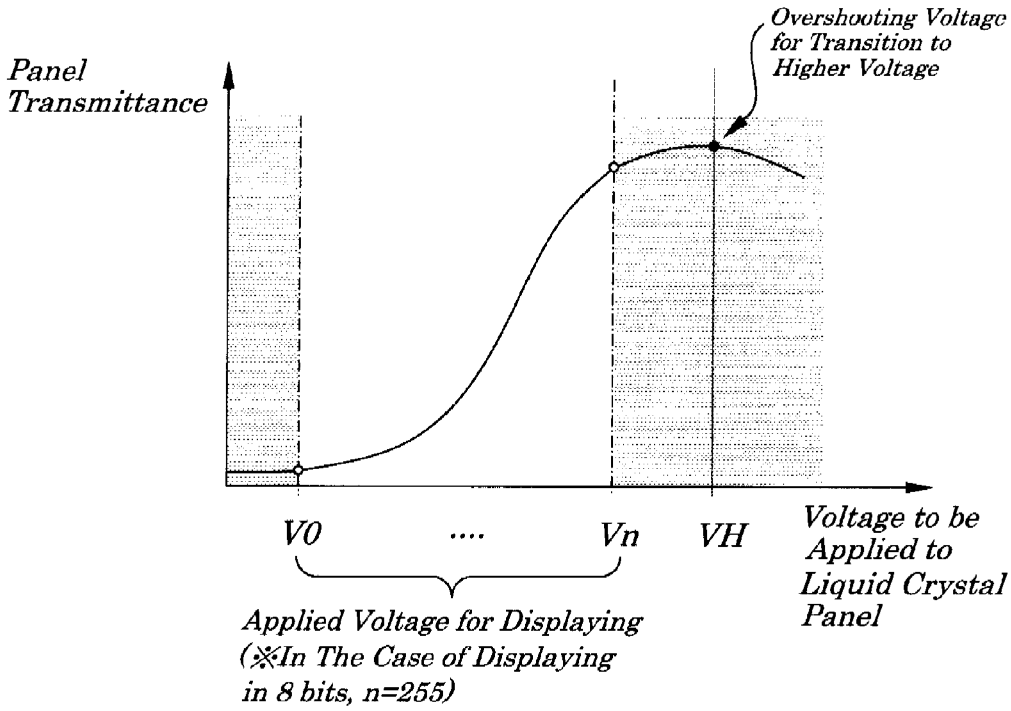
FIG. 7 is a diagram showing a method for driving a liquid crystal panel according to a fourth embodiment of the present invention.

FIG. 7 is a diagram showing a method for driving a liquid crystal panel according to the fourth embodiment of the present invention. In the method for driving a liquid crystal panel according to the fourth embodiment, as shown in FIG. 7, as a voltage to be applied to a liquid crystal panel, in addition to voltages for displaying V0, . . . , Vn, a voltage VH for overshooting driving for transition to a higher voltage is set in only the range of voltages being higher than an upper limit Vn in the range of the voltages for displaying and, when the voltage to be applied to the liquid crystal panel is changed to the maximum value Vn of the applied displaying voltage, an overshooting driving operation using the voltage VH is performed. On the other hand, for example, the minimum voltage V0 is used for displaying which is a lower limit of the voltages for displaying, however, when transition is made to the minimum value V0, no overshooting driving operation is performed.

According to the method of the fourth embodiment, an overshooting driving operation is made possible for transition among all gray levels, except gray levels near to the highest gray level, including transition to the lowest gray level for displaying, however, only when transition to the lowest gray level is made, a response speed of the liquid crystal display device is not increased.

Fifth Embodiment

Figure 8:
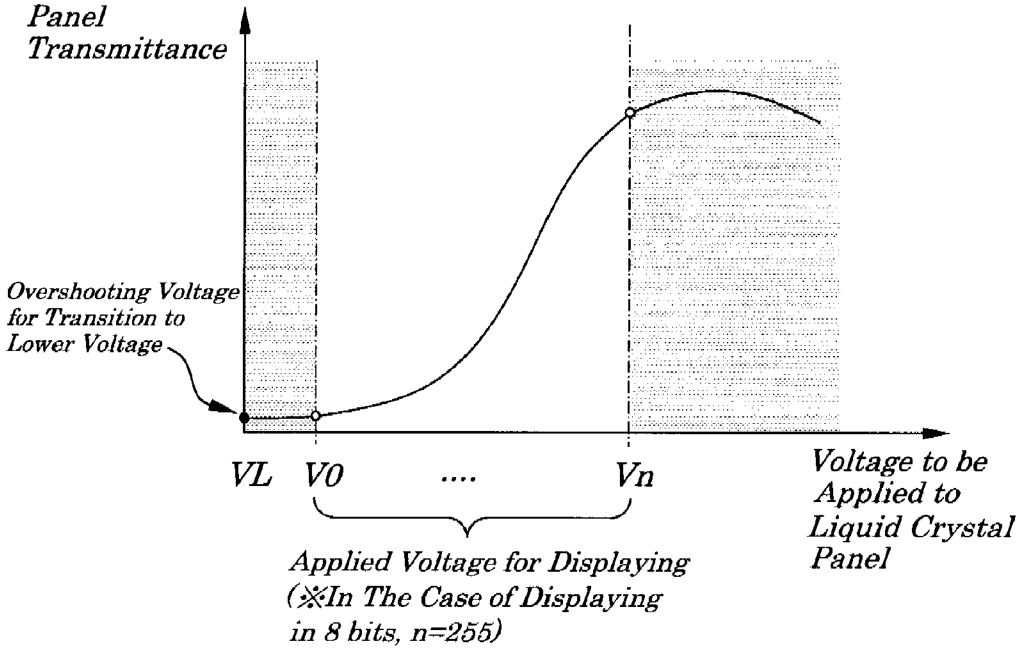
FIG. 8 is a diagram showing a method for driving a liquid crystal panel according to a fifth embodiment of the present invention.
Figure 9:
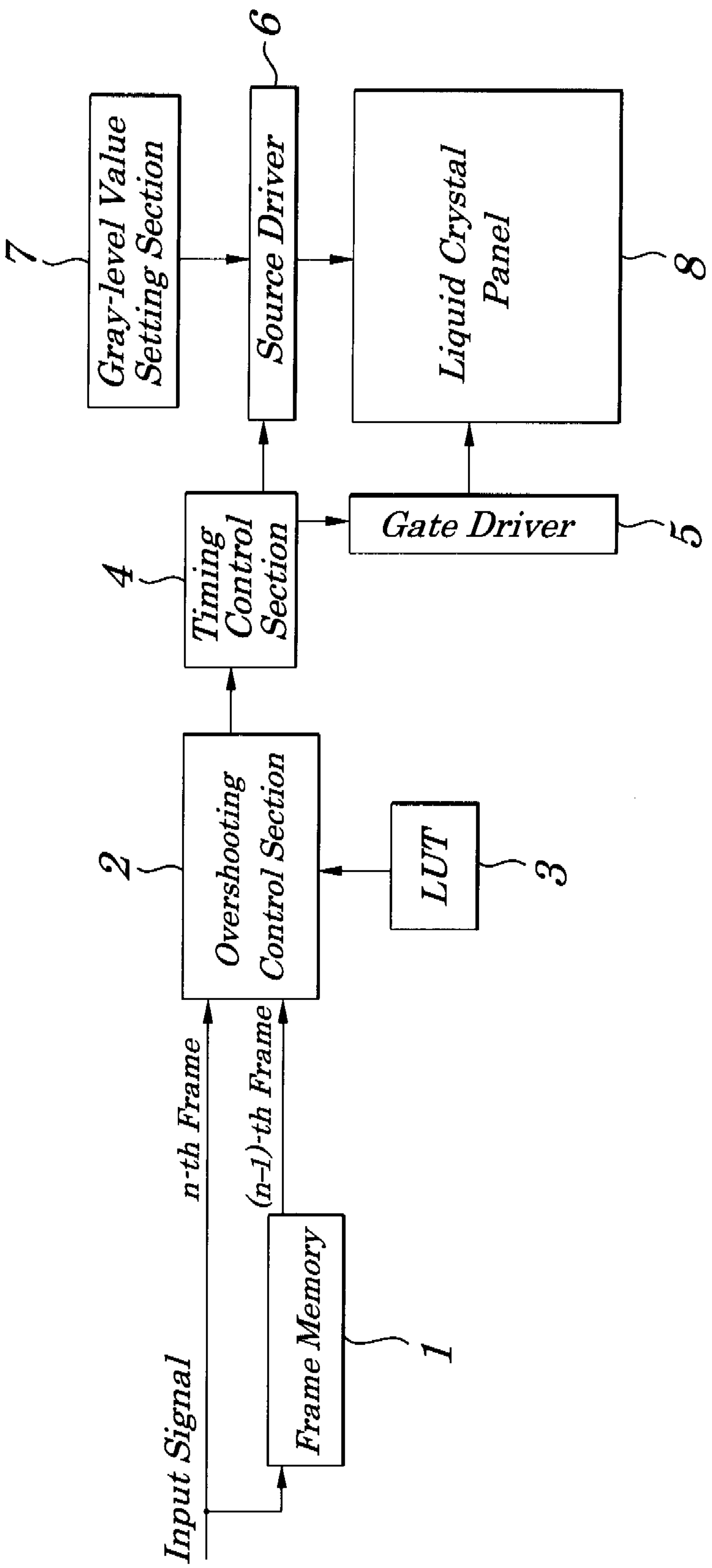
FIG.9 (RELATED ART)
FIG. 9 is a diagram showing an example of configurations of a liquid crystal display device of a conventional technology.

FIG. 8 is a diagram showing a method for driving a liquid crystal panel according to the fifth embodiment of the present invention. In the method for driving a liquid crystal panel according to the fourth embodiment, as shown in FIG. 7, as a voltage to be applied to a liquid crystal panel, in addition to voltages for displaying V0, . . . , Vn, a voltage VL for overshooting driving for transition to a higher voltage is set in only the range of voltages being higher than a lower limit V0 in the range of the voltages for displaying and, when the voltage to be applied to the liquid crystal panel is changed to the minimum value V0 of the applied displaying voltage, an overshooting driving operation using the voltage VH is performed. On the other hand, for example, the maximum voltage Vn is used for displaying which is a lower limit of the applied displaying voltage, however, when transition is made to the maximum value Vn, no overshooting driving operation is performed.

According to the method of the fourth embodiment, an overshooting driving operation is made possible for transition among all gray levels, except the lowest gray level, including transition to a lowest gray level for displaying, however, only when transition to the highest gray level is made, a response speed of the liquid crystal display device is not increased.

It is apparent that the present invention is not limited to the above embodiments but may be changed and modified without departing from the scope and spirit of the invention. For example, technologies of improving quality of moving images including a double-speed driving method in which a response speed is made higher so that a driving operation is performed on a liquid crystal panel at a refresh rate being twice higher than a normal speed in a duplicate manner, a blinking backlight method in which a driving operation is performed on a liquid crystal panel at a double refresh rate and a backlight is turned off at every one refresh rate, and a black writing method in which a driving operation is performed on a liquid crystal panel at a double refresh rate and a black is displayed at every one refresh rate can be applied to each of the above embodiments.

The liquid crystal driving method and the liquid crystal driving devices of the present invention can be applied generally to the liquid crystal panel of a liquid crystal television set or a portable phone, or to personal computers using a liquid crystal panel as a display device or a like.

What is claimed is:

1. A liquid crystal driving device comprising:

a liquid crystal panel whose transmittance changes depending on an applied voltage; and a source driver that applies a display voltage set according to a gray level of an input signal to said liquid crystal panel with timing determined by an input signal;

wherein, said source driver applies an overshooting driving voltage for only transition to a higher voltage, when the display voltage to be applied to said liquid crystal panel is controlled so as to be a highest-level voltage out of display voltages corresponding to a range of input gray levels, which is added to a voltage side being higher than said highest-level voltage out of said display voltages, to said liquid crystal panel;

wherein, said source driver applies an overshooting driving voltage for only transition to a lower voltage, when the display voltage to be applied to said liquid crystal panel is controlled so as to be a lowest-level voltage out of display voltages corresponding to a range of input gray levels, which is added to a voltage side being lower than said lowest-level voltage out of said display voltages, to said liquid crystal panel;

wherein the overshooting driving voltages for only transition to a higher voltage and for only transition to a lower voltage are set independently from said display voltages, each of which is output from a resistor ladder circuit, the overshooting driving voltages being output from a circuit other than said resistor ladder circuit;

wherein the overshooting driving voltages for only transition to a higher voltage and for only transition to a lower voltage are only used for overshooting driving voltages;

wherein a frame rate controller generates display voltages for halftones, corresponding to a number of voltages for input gray levels being in short supply caused by setting of the overshooting driving voltages for transition to a higher voltage and for transition to a lower voltage, based on the input signals; and wherein the frame rate controller generates the display voltages for halftones by performing a frame thinning-out operation for the number of voltages for input gray levels being in short supply;

wherein the display voltages for halftones are either continuous display voltages or discrete display voltages.

2. A liquid crystal driving device comprising:

a liquid crystal panel whose transmittance changes depending on an applied voltage; and a source driver that applies a display voltage set according to a gray level of an input signal to said liquid crystal panel with timing determined by an input signal;

wherein said source driver applies a first overshooting driving voltage for only transition to a higher (or lower) voltage, when the display voltage to be applied to said liquid crystal panel is controlled so as to be a highest-level (or lowest-level) voltage out of display voltages corresponding to a range of input gray levels, which is added to a voltage side being higher (or lower) than said highest-level (or lowest-level) voltage out of said display voltages to said liquid crystal panel, wherein said source driver uses voltages between a voltage being higher (or lower) by voltages corresponding to m gray levels from said lowest-level (or highest-level) voltage and said lowest-level (or highest-level) voltage as a second overshooting driving voltage for a transition to a lower (or higher) voltage, when the display voltage to be applied to said liquid crystal panel is controlled so as to be a lowest-level (or highest-level) voltage side out of said display voltages corresponding to a range of input gray levels;

wherein the first and second overshooting driving voltages are set independently from said display voltages, each of which is output from a resistor ladder circuit, the first and second overshooting driving voltages being output from a circuit other than said resistor ladder circuit;

wherein the overshooting driving voltages for only transition to a higher voltage and for only transition to a lower voltage are only used for overshooting driving voltages;

wherein a frame rate controller generates display voltages for halftones, corresponding to a number of voltages for input gray levels being in short supply caused by setting of the overshooting driving voltages for transition to a higher voltage and for transition to a lower voltage, based on the input signals; and wherein the frame rate controller generates the display voltages for halftones by performing a frame thinning-out operation for the number of voltages for input gray levels being in short supply;

wherein the display voltages for halftones are either continuous display voltages or discrete display voltages.

3. A liquid crystal driving device comprising:

a liquid crystal panel whose transmittance changes depending on an applied voltage; and a source driver that applies a display voltage set according to a gray level of an input signal to said liquid crystal panel with timing determined by an input signal;

wherein said source driver applies an overshooting driving voltage for only transition to a higher (or lower) voltage, when the display voltage to be applied to said liquid crystal panel is controlled so as to be a highest-level (or lowest-level) voltage out of display voltages corresponding to a range of input gray levels, which is added to a voltage side being higher (or lower) than said highest-level (or lowest-level) voltage out of said display voltages, to said liquid crystal panel;

wherein, when the display voltage to be applied to said liquid crystal panel is controlled so as to be a lowest-level (or highest-level) voltage out of said display voltages corresponding to a range of input gray levels, no overshooting driving operation is performed;

wherein the overshooting driving voltage is set independently from said display voltages, each of which is output from a resistor ladder circuit, the overshooting driving voltage being output from a circuit other than said resistor ladder circuit;

wherein the overshooting driving voltages for only transition to a higher voltage and for only transition to a lower voltage are only used for overshooting driving voltages;

wherein a frame rate controller generates display voltages for halftones, corresponding to a number of voltages for input gray levels being in short supply caused by setting of the overshooting driving voltages for transition to a higher voltage and for transition to a lower voltage, based on the input signals; and wherein the frame rate controller generates the display voltages for halftones by performing a frame thinning-out operation for the number of voltages for input gray levels being in short supply;

wherein the display voltages for halftones are either continuous display voltages or discrete display voltages.

4. A liquid crystal driving device comprising:

an active matrix type of liquid crystal panel whose transmittance changes depending on an applied voltage; and a source driving means that applies a display voltage set according to a gray level of an input signal to said liquid crystal panel with timing determined by an input signal, the display voltage applied to a source electrode of a thin film transistor corresponding to a picture element making up said liquid crystal panel;

wherein, said source driving means applies an overshooting driving voltage for only transition to a higher voltage, when the display voltage to be applied to said liquid crystal panel is controlled so as to be a highest-level voltage out of display voltages corresponding to a range of input gray levels, which is added to a voltage side being higher than said highest-level voltage out of said display voltages, to said liquid crystal panel;

wherein, said source driving means applies an overshooting driving voltage for only transition to a lower voltage, when the display voltage to be applied to said liquid crystal panel is controlled so as to be said lowest-level voltage out of display voltages corresponding to a range of input gray levels, which is added to a voltage side being lower than said lowest-level voltage out of said display voltages, to said liquid crystal panel;

wherein the overshooting driving voltages for only transition to a higher voltage and for only transition to a lower voltage are set independently from said display voltages, each of which is output from a resistor ladder circuit, the overshooting driving voltages being output from a circuit other than said resistor ladder circuit;

wherein the overshooting driving voltages for only transition to a higher voltage and for only transition to a lower voltage are only used for overshooting driving voltages;

wherein a frame rate controller generates display voltages for halftones, corresponding to a number of voltages for input gray levels being in short supply caused by setting of the overshooting driving voltages for transition to a higher voltage and for transition to a lower voltage, based on the input signals; and wherein the frame rate controller generates the display voltages for halftones by performing a frame thinning-out operation for the number of voltages for input gray levels being in short supply;

wherein the display voltages for halftones are either continuous display voltages or discrete display voltages.

5. A liquid crystal driving device comprising:

an active matrix type of liquid crystal panel whose transmittance changes depending on an applied voltage; and a source driving means that applies a display voltage set according to a gray level of an input signal to said liquid crystal panel with timing determined by an input signal, the display voltage applied to a source electrode of a thin film transistor corresponding to a picture element making up said liquid crystal panel;

wherein said source driving means applies a first overshooting driving voltage for only transition to a higher (or lower) voltage, when the display voltage to be applied to said liquid crystal panel is controlled so as to be a highest-level (or lowest-level) voltage out of display voltages corresponding to a range of input gray levels, which is added to a voltage side being higher (or lower) than said highest-level (or lowest-level) voltage out of said display voltages to said liquid crystal panel;

wherein said source driving means uses voltages between a voltage being higher (or lower) by voltages corresponding to m gray levels from said lowest-level (or highest-level) voltage and said lowest-level (or highest-level) voltage as a second overshooting driving voltage for a transition to a lower (or higher) voltage, when the display voltage to be applied to said liquid crystal panel is controlled so as to be a lowest-level (or highest-level) voltage side out of said display voltages corresponding to a range of input gray levels;

wherein the first and second overshooting driving voltages are set independently from said display voltages, each of which is output from a resistor ladder circuit, the first and second overshooting driving voltages being output from a circuit other than said resistor ladder circuit;

wherein the overshooting driving voltages for only transition to a higher voltage and for only transition to a lower voltage are only used for overshooting driving voltages;

wherein a frame rate controller generates display voltages for halftones, corresponding to a number of voltages for input gray levels being in short supply caused by setting of the overshooting driving voltages for transition to a higher voltage and for transition to a lower voltage, based on the input signals; and wherein the frame rate controller generates the display voltages for halftones by performing a frame thinning-out operation for the number of voltages for input gray levels being in short supply;

wherein the display voltages for halftones are either continuous display voltages or discrete display voltages.

6. A liquid crystal driving device comprising:

an active matrix type of liquid crystal panel whose transmittance changes depending on an applied voltage; and a source driving means that applies a display voltage set according to a gray level of an input signal to said liquid crystal panel with timing determined by an input signal, the display voltage applied to a source electrode of a thin film transistor corresponding to a picture element making up said liquid crystal panel;

wherein said source driving means applies an overshooting driving voltage for only transition to a higher (or lower) voltage, when the display voltage to be applied to said liquid crystal panel is controlled so as to be a highest-level (or lowest-level) voltage out of display voltages corresponding to a range of input gray levels, which is added to a voltage side being higher (or lower) than said highest-level (or lowest-level) voltage out of said display voltages, to said liquid crystal panel;

wherein, when the display voltage to be applied to said liquid crystal panel is controlled so as to be a lowest-level (or highest-level) voltage out of said display voltages corresponding to a range of input gray levels, no overshooting driving operation is performed; wherein the overshooting driving voltage is set independently from said display voltages, each of which is output from a resistor ladder circuit, the overshooting driving voltage being output from a circuit other than said resistor ladder circuit;

wherein the overshooting driving voltages for only transition to a higher voltage and for only transition to a lower voltage are only used for overshooting driving voltages;

wherein a frame rate controller generates display voltages for halftones, corresponding to a number of voltages for input gray levels being in short supply caused by setting of the overshooting driving voltages for transition to a higher voltage and for transition to a lower voltage, based on the input signals; and wherein the frame rate controller generates the display voltages for halftones by performing a frame thinning-out operation for the number of voltages for input gray levels being in short supply;

wherein the display voltages for halftones are either continuous display voltages or discrete display voltages.

* * * * *